No. 694,010. Patented Feb. 25, 1902.
C. F. GROHMANN.
DEVICE FOR STEERING AGRICULTURAL MACHINES.
(Application filed Apr. 12, 1901.)
(No Model.) 2 Sheets—Sheet 1.

Witnesses
Frank S. Ober
Walas M. Chapin

Inventor
Carl F. Grohmann
by W. A. Rosenbaum
Atty.

No. 694,010. Patented Feb. 25, 1902.
C. F. GROHMANN.
DEVICE FOR STEERING AGRICULTURAL MACHINES.
(Application filed Apr. 12, 1901.)

(No Model.) 2 Sheets—Sheet 2.

Witnesses

Inventor
Carl F. Grohmann

UNITED STATES PATENT OFFICE.

CARL FERDINAND GROHMANN, OF GÜSTROW, GERMANY.

DEVICE FOR STEERING AGRICULTURAL MACHINES.

SPECIFICATION forming part of Letters Patent No. 694,010, dated February 25, 1902.

Application filed April 12, 1901. Serial No. 55,477. (No model.)

*To all whom it may concern:*

Be it known that I, CARL FERDINAND GROHMANN, a subject of the Grand Duke of Mecklenburg-Schwerin, residing at Güstrow, in the Grand Duchy of Mecklenburg-Schwerin, in the German Empire, have invented certain new and useful Improvements in Devices for Steering Agricultural Machines, of which the following is a specification.

My present invention relates to a device for steering agricultural machines having a frame consisting of side beams or cheeks.

The characteristic feature of my invention is that the steering is effected by laterally moving the cheeks of the front part of the frame relative to the pole-bolt, connected rigidly with the front wheels by means of a steering-lever.

Figure 1:
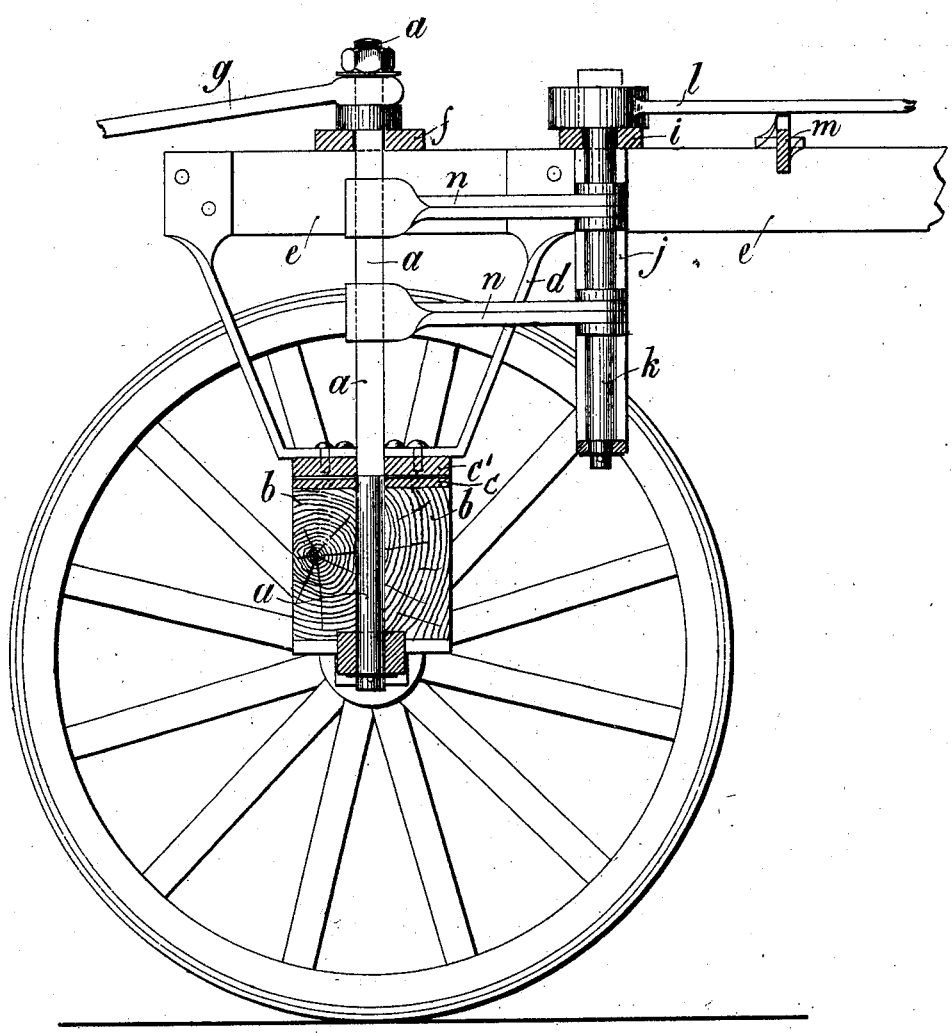
Figure 2:
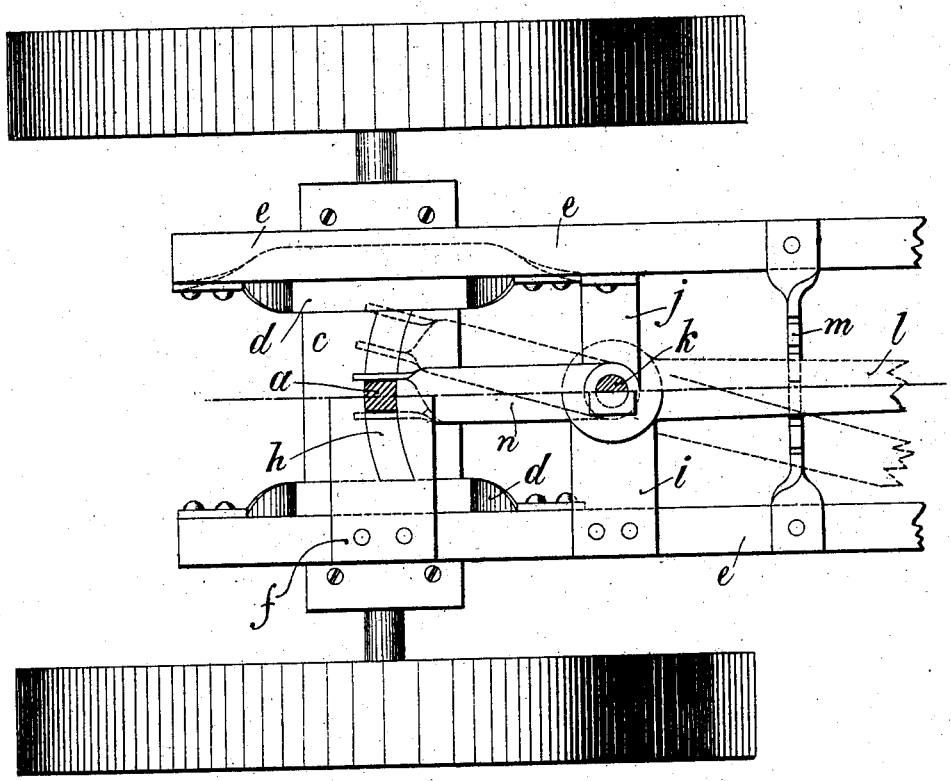

In the accompanying drawings, representing one form of my invention, Figure 1 represents a side view of the device applied to the front wheels of the machine, and Fig. 2 is a plan.

To the axle of the front wheel is secured the pole-bolt $a$, which passes through a beam $b$, situated on the axle, and which is provided on the top with a strengthening-plate $c$. On the plate $c$ there is a second plate $c'$, which is connected by the frame $d$ to the side beams or cheeks $e$ of the front part of the machine. On the beam $e$ there is a plate $f$, which connects the said beams. Through this plate $f$ passes the pole-bolt $a$, on the top end of which the drawing-pole $g$ is secured by a nut, a washer being interposed, as shown in Fig. 1. The plates $c'$ and $f$ are each provided with an arc-shaped slot $h$, in which the pole-bolt $a$ is situated. To a transverse plate $i$, connecting the two side beams or cheeks $e$, is secured a downwardly-projecting bearing $j$, in which turns the shaft $k$. To this shaft $k$ is secured at the top a steering-lever $l$, which is directed toward the back part of the machine and is adapted to engage in grooves in a rail $m$, connecting the side beams or cheeks $e$. To the shaft $k$ two claws $n$ are also secured, the ends of which are forked and inclose the pole-bolt $a$. If now the steering-lever $l$ is moved about its shaft $k$, the claws $n$ will likewise be moved and will have a tendency to move the pole-bolt $a$. As, however, this bolt is fixed in the axle, the upper part of the front part of the machine—that is, the side beams or cheeks—will be moved, the position of the pole being altered in the slots in the plates $c'$ and $f$. As a consequence the share of the machine will be likewise moved so that it can exactly follow every furrow in the ground. When the machine is moving in a straight line, the steering-lever $l$ can be secured in one of the grooves in the rail $m$.

The above-described construction is of course only one form of carrying out my invention, which can be adapted in any suitable manner to agricultural machines of all kinds.

What I claim is—

1. In an agricultural machine a steering device comprising a pole-bolt $a$ secured to the front axle of the machine, a vertical shaft $k$ secured to the upper part of the frame of the machine, claws $n$ secured at one end to the vertical shaft $k$ and inclosing the pole-bolt $a$ at the other end, a steering-lever $l$ secured to the vertical shaft $k$, substantially as set forth.

2. In an agricultural machine a steering device comprising in combination a pole-bolt $a$ secured to the front axle of the machine, a beam $b$ secured on said axle, a plate $c'$ possessing a slot $h$ and secured to the frame of the machine, a plate $f$ connecting the two side beams $e$ and possessing a slot $h$, a vertical shaft $k$ secured to the upper part of the frame of the machine, claws $n$ secured at one end to the vertical shaft $k$ and inclosing at the other end the pole-bolt $a$, a steering-lever $l$ secured to the vertical shaft $k$, substantially as set forth and for the purpose specified.

3. In an agricultural machine a steering device comprising in combination a pole-bolt $a$ secured to the front axle of the machine, a beam $b$ secured on said axle, a plate $c$ attached to the top of said beam, a plate $c'$ resting on the said plate $c$ and possessing a slot $h$ and secured to the frame of the machine a plate $f$ connecting the two side beams $e$ and possessing a slot $h$ a vertical shaft $k$ turning in bearings $j$ secured to the frame of the machine, two claws $n$ secured at one end to the vertical shaft $k$ and surrounding at the other end the pole-bolt $a$, a steering-lever $l$ secured to the vertical shaft $k$, a rail $m$ between the two side beams $e$ and provided with notches adapted to hold the steering-lever $l$ in any desired position, substantially as set forth and for the purpose specified.

In testimony whereof I have hereunto set my hand in the presence of two witnesses.

CARL FERDINAND GROHMANN.

Witnesses:
 GUSTAV WEBER,
 PAUL FRIEDR. DÜHRKOOP.